United States Patent
Ollila et al.

(10) Patent No.: US 9,751,037 B2
(45) Date of Patent: Sep. 5, 2017

(54) DEMISTER, METHOD OF MODIFYING AN EXISTING WET-TYPE GAS SCRUBBER AND WET-TYPE GAS SCRUBBER

(71) Applicant: OUTOTEC (FINLAND) OY, Espoo (FI)

(72) Inventors: Janne Ollila, Espoo (FI); Tom Rönnberg, Espoo (FI)

(73) Assignee: Outotec (Finland) Oy, Espoo (FI)

( * ) Notice: Subject to any disclaimer, the term of this patent is extended or adjusted under 35 U.S.C. 154(b) by 410 days.

(21) Appl. No.: 14/403,636

(22) PCT Filed: Jun. 3, 2013

(86) PCT No.: PCT/FI2013/050599
§ 371 (c)(1),
(2) Date: Nov. 25, 2014

(87) PCT Pub. No.: WO2013/182748
PCT Pub. Date: Dec. 12, 2013

(65) Prior Publication Data
US 2015/0165364 A1    Jun. 18, 2015

(30) Foreign Application Priority Data
Jun. 4, 2012  (FI) ..................... 20125605

(51) Int. Cl.
*B01D 45/12*  (2006.01)
*B01D 47/06*  (2006.01)
(Continued)

(52) U.S. Cl.
CPC ........... *B01D 50/004* (2013.01); *B01D 45/12* (2013.01); *B01D 45/16* (2013.01); *B01D 47/06* (2013.01);
(Continued)

(58) Field of Classification Search
CPC ........ B01D 45/12; B01D 45/16; B01D 47/02; B01D 47/10; B01D 50/004; B01D 53/78; Y10T 29/49716
(Continued)

(56) References Cited

U.S. PATENT DOCUMENTS 3,488,039 A * 1/1970 Ekman .................. B01D 46/32
                                                          261/112.1
3,950,493 A    4/1976 Dorr et al.
(Continued)

FOREIGN PATENT DOCUMENTS

CN    201211460       3/2009
CN    202113736 U     1/2012
(Continued)

OTHER PUBLICATIONS

The International Bureau of WIPO, International Preliminary Report on Patentability w/ attached Written Opinion of the International Searching Authority, issued in pending PCT application PCT/FI2013/050599, dated Dec. 9, 2014, 10 pages, World Intellectual Property Organization, Geneva, Switzerland.
(Continued)

*Primary Examiner* — Frank Lawrence
(74) *Attorney, Agent, or Firm* — Chernoff, Vilhauer, McClung & Stenzel, LLP

(57) ABSTRACT

The invention relates to a demister (1) configured for installation to a wet-type gas scrubber (2). The wet-type gas scrubber (2) comprises a wet-scrubbing phase (3) and a liquid separation phase (4). The liquid separation phase (4) includes a liquid collecting tank (5) and a cyclonic droplet separation tower (6) attached on the liquid collecting tank for receiving a gas stream therefrom. The demister (1) comprises a mist eliminator unit (A) for removal of liquid droplets in a gas stream. The invention also relates to a
(Continued)

method of modifying an existing wet-type gas scrubber (2) by including the demister (1). The invention further relates to a wet-type gas scrubber (2) comprising the demister (1). The demister (1) is a separate integral unit adapted to be removably attachable between the liquid collecting tank (5) and the cyclonic droplet separation tower (6).

16 Claims, 4 Drawing Sheets

(51) Int. Cl.
  *B01D 50/00* (2006.01)
  *B01D 53/78* (2006.01)
  *B01D 47/10* (2006.01)
  *B01D 45/16* (2006.01)

(52) U.S. Cl.
  CPC .............. *B01D 47/10* (2013.01); *B01D 53/78* (2013.01); *B01D 2247/101* (2013.01); *B01D 2247/106* (2013.01); *B01D 2247/107* (2013.01); *Y10T 29/49716* (2015.01)

(58) Field of Classification Search
  USPC .......... 96/228, 301, 206, 311, 312, 355, 363
  See application file for complete search history.

(56) References Cited

U.S. PATENT DOCUMENTS

| | | | | |
|---|---|---|---|---|
| 4,140,501 A * | 2/1979 | Ekman | ................... | B01D 53/18 261/111 |
| 4,865,803 A * | 9/1989 | Dillmann | ................ | B01D 46/12 376/313 |
| 5,300,131 A * | 4/1994 | Richard | ................. | B01D 45/08 96/297 |
| 5,336,284 A * | 8/1994 | Schifftner | .............. | B01D 47/10 261/116 |
| 5,505,752 A * | 4/1996 | Burrous | ................. | B01D 45/06 55/356 |
| 6,083,291 A * | 7/2000 | Okada | .................... | B01D 45/12 55/337 |
| 6,102,990 A | 8/2000 | Keinänen et al. | | |
| 2009/0183632 A1 | 7/2009 | Peltonen et al. | | |
| 2009/0186632 A1 | 7/2009 | Kennedy, Jr. et al. | | |
| 2010/0126349 A1 * | 5/2010 | Vermeulen | ............. | B01D 47/05 95/229 |
| 2013/0068104 A1 | 3/2013 | Brown et al. | | |

FOREIGN PATENT DOCUMENTS

| | | |
|---|---|---|
| DE | 3438400 | 4/1986 |
| DE | 3438400 A1 | 4/1986 |
| EP | 0489575 A1 * | 6/1992 |
| FI | 118989 | 6/2008 |
| GB | 1421165 | 1/1976 |
| GB | 2165466 | 4/1986 |
| GB | 2469319 | 10/2010 |
| WO | 9212786 | 8/1992 |

OTHER PUBLICATIONS

Search report from priority Finnish Application No. 20125605, dated Mar. 18, 2013, 1 pg.
Office Action from priority Finnish Application No. 20125605, dated Sep. 27, 2013, 5 pgs.
Search report from corresponding PCT Application No. PCT/FI2013/050599, dated Sep. 16, 2013, 4 pgs.
State Intellectual Property Office of the People's Republic of China; First Office Action issued in application No. 201380029432.9; dated Aug. 27, 2015; Beijing, China.
Xue Jian Ming, "Handbook on Wet-type Exhaust Gas Desulfidation Design and Apparatus Type Selection" (book), Oct. 1, 2011, p. 115, China Electricity Publishing House.
Zhou Chi Jun, "Handbook on Environmental Engineering Apparatus Design" (book), Jan. 1, 2009, pp. 202-204, Chemical Industry Press.

* cited by examiner

DEMISTER, METHOD OF MODIFYING AN
EXISTING WET-TYPE GAS SCRUBBER AND
WET-TYPE GAS SCRUBBER

This is a national stage application filed under 35 USC 371 based on International Application No. PCT/FI2013/050599 filed Jun. 3, 2013 and claims priority under 35 USC 119 of Finnish Patent Application No. 20125605 filed Jun. 4, 2012.

FIELD OF THE INVENTION

The present invention relates to a demister configured for installation to a wet-type gas scrubber which comprises a wet-scrubbing phase and a liquid separation phase, said liquid separation phase including a liquid collecting tank and a cyclonic droplet separation tower attached to the liquid collecting tank for receiving a gas stream therefrom, said demister comprising a mist eliminator unit for removal of liquid droplets entrained in a gas stream. Also, the present invention relates to a method of modifying an existing wet-type gas scrubber by including said demister. Further, the invention relates to a wet-type gas scrubber comprising said demister.

BACKGROUND OF THE INVENTION

A demister is a device disposed to remove liquid droplets entrained in a gas stream. Vane-type demisters and mesh-type demisters are known in the art. In prior art it is known from e.g. documents GB 2 165 466 A and GB 1 421 165 to install a demister inside a cyclonic droplet separation tower of a wet-type gas scrubber. The problem with this type of demister installation is that the demister is difficult to remove for maintenance and/or for cleaning.

There is also a constant need to improve the cleaning efficiency of existing gas scrubbers while the emission standards are tightened. Therefore, there is a need for an easy and quick method for modifying an existing gas scrubber to improve its cleaning efficiency.

Therefore, an object of the present invention is to alleviate the problems described above.

SUMMARY OF THE INVENTION

A first aspect of the present invention is a demister configured for installation to a wet-type gas scrubber which comprises a wet-scrubbing phase and a liquid separation phase. The liquid separation phase includes a liquid collecting tank and a cyclonic droplet separation tower attached to the liquid collecting tank for receiving a gas stream therefrom. The demister (1) comprises a mist eliminator unit for removal of liquid droplets from a gas stream. According to the invention the demister is a separate integral unit adapted to be removably attachable between the liquid collecting tank and the cyclonic droplet separation tower.

The advantage of the invention is that the demister can be handled as an integral unit and can be easily installed and removed for maintenance and/or for cleaning. The demister of the invention can be used in a factory-built gas scrubber as part of the final product or as an accessory which can be retrofitted to an existing gas scrubber to improve its cleaning efficiency.

A second aspect of the present invention is a method of modifying an existing wet-type gas scrubber by including the demister. The gas scrubber comprises a wet-scrubbing phase and a liquid separation phase. The liquid separation phase includes a liquid collecting tank and a cyclonic droplet separation tower fixedly attached on the liquid collecting tank for receiving a gas stream therefrom. According to the invention the method comprises the steps of: detaching the cyclonic droplet separation tower from the liquid collecting tank, or cutting the cyclonic droplet separation tower at a point adjacent to the liquid collecting tank; attaching a second mounting element to the liquid collecting tank or to the part of the cyclonic droplet separation tower which remained attached to the liquid collecting tank after cutting; attaching a fourth mounting element to the lower end of the cyclonic droplet separation tower; and installing the demister by mounting a first mounting element of the demister to the second mounting element of the liquid collecting tank, and by mounting the fourth mounting element of the cyclonic droplet separation tower to a third mounting element of the demister.

A third aspect of the present invention is a wet-type gas scrubber comprising a wet-scrubbing phase and a liquid separation phase. The liquid separation phase includes a liquid collecting tank and a cyclonic droplet separation tower attached on the liquid collecting tank for receiving a gas stream therefrom. The gas scrubber further includes a demister comprising a mist eliminator unit for removal of liquid droplets in a gas stream. According to the invention the demister is a separate integral unit adapted to be removably attachable between the liquid collecting tank and the cyclonic droplet separation tower.

In an embodiment of the invention, the demister comprises a tubular frame inside which the mist eliminator units are arranged. The tubular frame has a first mounting element adapted for mounting to a corresponding second mounting element of the liquid collecting tank, and a third mounting element adapted for mounting to a corresponding fourth mounting element of the cyclonic droplet separation tower.

In an embodiment of the invention, the mounting elements are mounting flanges with a plurality of bolt holes.

In an embodiment of the invention, the frame comprises a tubular outer wall having an inner diameter which substantially equals the inner diameter of the cyclonic droplet separation tower, and a tubular inner wall having an outer diameter which is smaller than the inner diameter of the outer wall, said inner wall being disposed coaxially inside the outer wall, and the mist eliminator unit is mounted inside the inner wall.

In an embodiment of the invention, the frame comprises a launder for collecting liquid and solids, said launder having an inner space limited by the outer wall, the inner wall and a bottom; and a discharge channel in the outer wall adjacent to the bottom for removal of liquid and solids from the inner space of the launder.

In an embodiment of the invention, the demister comprises jet nozzles each adapted for spraying a jet of pressurized cleaning medium, such as pressurized liquid or gas, to clean the mist eliminator unit and/or the launder from accumulated solids.

In an embodiment of the invention, the mist eliminator unit comprises a vane-type mist eliminator.

In an embodiment of the invention, the mist eliminator comprises a plurality of radially arranged fixed swirl vanes to cause a swirling motion in the gas stream.

In an embodiment of the invention, the mist eliminator unit comprises a mesh-type mist eliminator.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
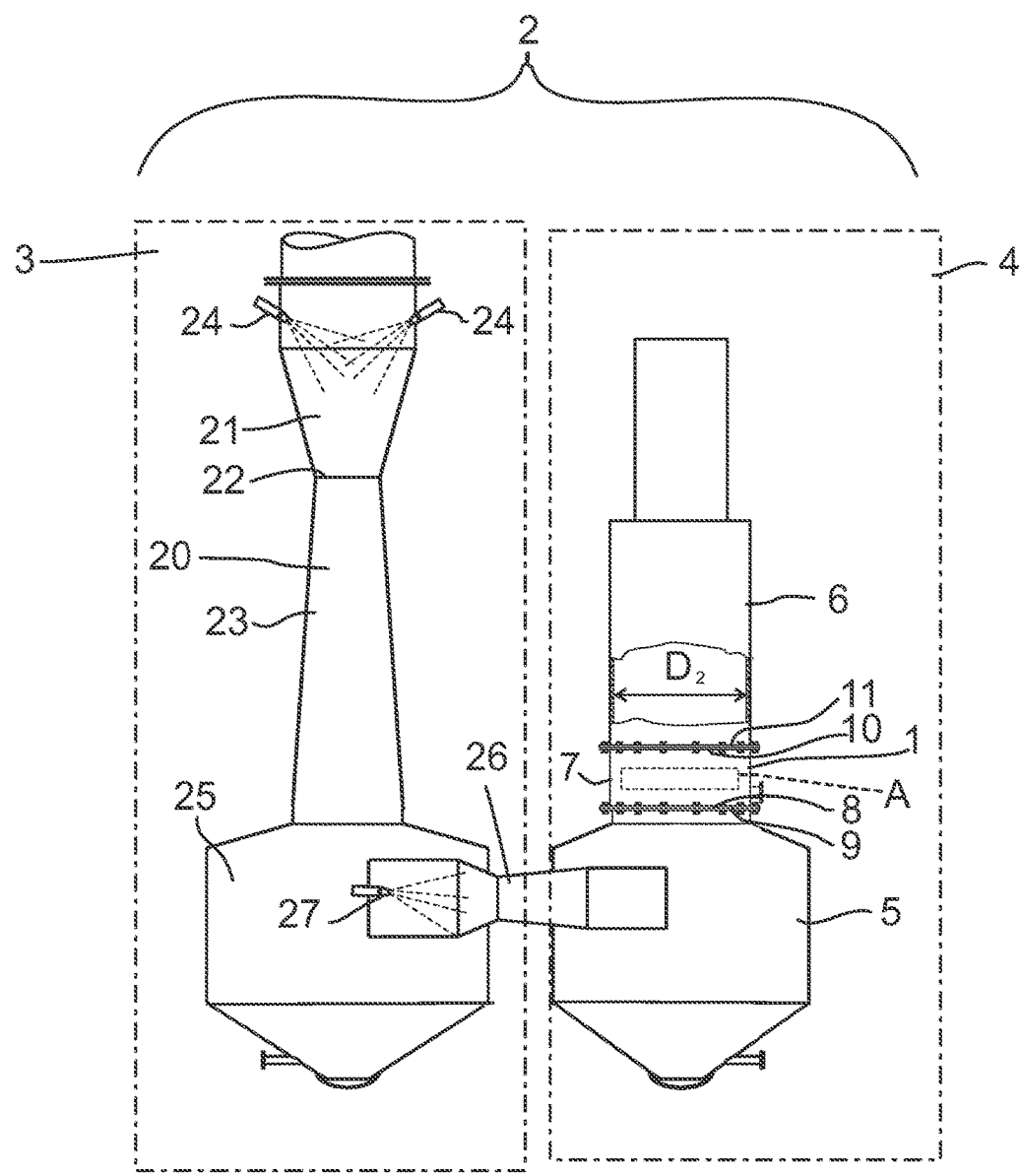
FIG. 1 shows a side view of a wet-type gas scrubber according to one embodiment of the invention equipped with a demister according to one embodiment of the invention.

FIG. 1 shows a wet-type gas scrubber 2 which in this example is a venturi scrubber. The venturi scrubber 2 comprises a wet-scrubbing phase 3 and a liquid separation phase 4. The wet-scrubbing phase 3 comprises an upright ejector venturi tube 20. The venturi tube 20 comprises a converging section 21, a throat 22 and a diverging section 23. A nozzle 24 for the injection of liquid is disposed at the upper portion of the venturi tube. In practice, dust laden gases, e.g. hot furnace gas from an electric arc furnace (not shown), enter the venturi tube 20 and instantly make contact with scrubbing liquid (e.g. water) injected via the nozzles 24. At the venturi throat 22 the gas and liquid streams collide and the liquid breaks down into droplets which trap dust particles. They enter the sedimentation tank 25 which is partially filled with liquid and wherein the particles are separated from the gas into the liquid. From the sedimentation tank 25 the gas containing liquid droplets is led to a horizontal venturi tube 26 wherein the gas is further scrubbed by means of a liquid jet discharged through a nozzle 27. The horizontal venturi tube 26 is arranged to discharge the gas containing liquid droplets tangentially to a liquid separation phase 4. The liquid separation phase 4 includes a liquid collecting tank 5 and a cyclonic droplet separation tower 6 which is attached on the liquid collecting tank 5 for receiving a gas stream therefrom. A demister 1 is disposed between the liquid collecting tank 5 and the cyclonic droplet separation tower 6.

The demister 1 is a separate integral unit adapted to be removably attachable between the liquid collecting tank 5 and the cyclonic droplet separation tower 6. The demister 1 comprises a tubular frame 7 inside which a mist eliminator unit A is arranged. The demister 1 may be either one of the types shown in FIGS. 2 and 3 (which show an example of a vane-type mist eliminator) and FIGS. 4 and 5 (which show an example of a mesh-type mist eliminator). Also, a combination of different kinds of mist eliminator units A built in a common frame 7 of the demister unit 1 is possible.

Figure 2:
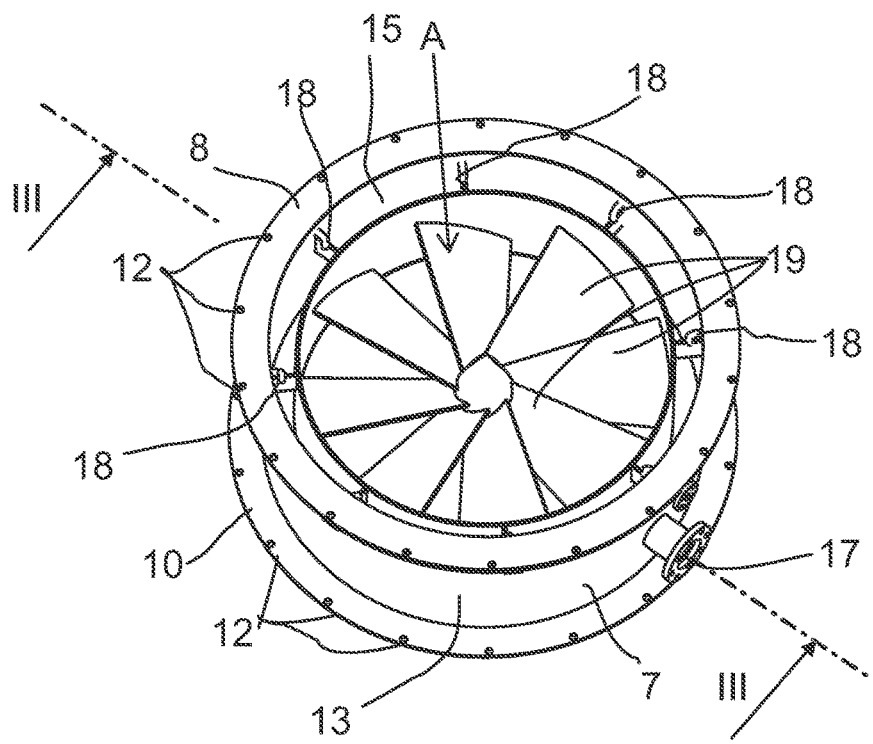
FIG. 2 is an axonometric view, seen obliquely from above, of a demister according to a first embodiment of the invention.
Figure 3:
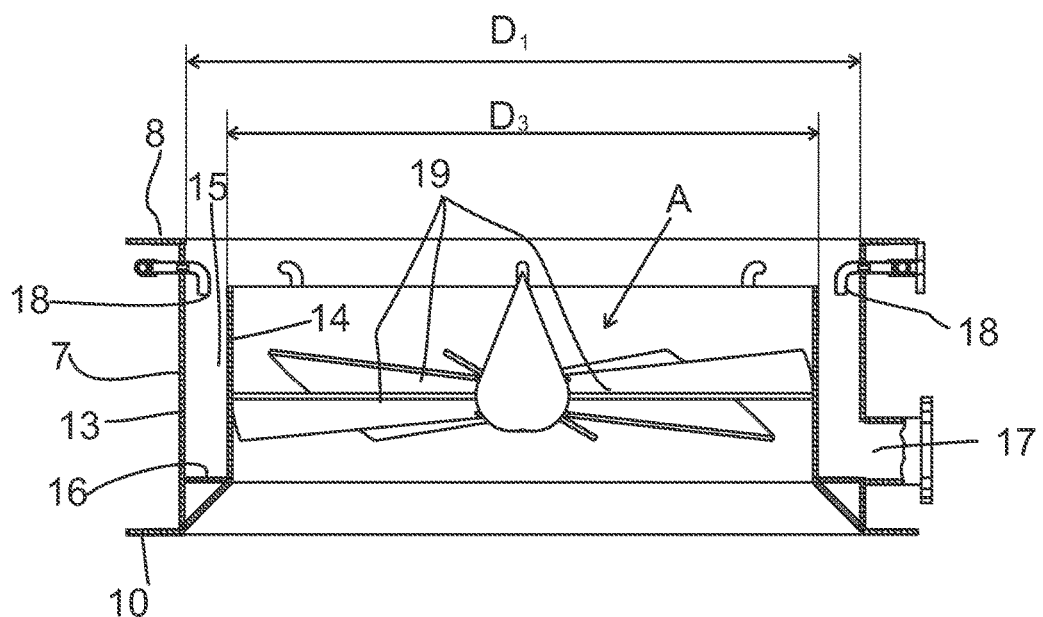
FIG. 3 is a cross-section III-III from FIG. 2.

With reference to FIG. 1 to FIG. 3, the tubular frame 7 comprises a first mounting flange 8 which is adapted suitable for mounting to a corresponding second mounting flange 9 of the liquid collecting tank 5. Further, the tubular frame 7 comprises a third mounting flange 10 which is adapted suitable for mounting to a corresponding fourth mounting flange 11 of the cyclonic droplet separation tower 6. The mounting flanges 8, 9, 10, 11 each include a plurality of bolt holes 12 for the attachment by bolt joints.

In FIGS. 2 and 3 and FIGS. 4 and 5 the demister 1 is shown in detail. The tubular frame 7 comprises a tubular outer wall 13 having an inner diameter $D_1$ which substantially equals the inner diameter $D_2$ of the cyclonic droplet separation tower 6 (see FIG. 1). The tubular frame 7 further comprises a tubular inner wall 14 having an outer diameter $D_3$ which is smaller than the inner diameter $D_1$ of the outer wall 13, said inner wall 14 being disposed coaxially inside the outer wall 13, and the mist eliminator unit A is mounted inside the inner wall. The frame 7 comprises a launder 15 for collecting liquid and solids, said launder having an inner space limited by the outer wall 13, the inner wall 14 and a bottom 16. A discharge channel 17 is disposed in the outer wall 13 adjacent to the bottom 16. The discharge channel 17 serves as a drainage for removal of liquid and solids from the inner space of the launder 15. This structure allows the liquid separated from the gas in the cyclonic droplet separation tower 6 leaking down along the inner surface of the wall of the tower 6 to fall into the launder 15 wherefrom it is removed via the discharge channel 17.

The demister 1 also comprises jet nozzles 18 which are adapted for spraying jets of pressurized cleaning medium, such as pressurized liquid or gas, to clean the mist eliminator unit A and/or the launder 15 from accumulated solids.

In FIGS. 2 and 3 the mist eliminator unit A is a vane-type mist eliminator which comprises a plurality of radially arranged fixed swirl vanes 19 to cause a swirling motion in the gas stream. The outer ends of the vanes are fixed to the inner surface of the inner wall 14. The vigorous swirling motion of the gas caused by the swirl vanes 19 effectively improves droplet separation rate in the subsequent cyclonic droplet separation tower 6.

Figure 4:
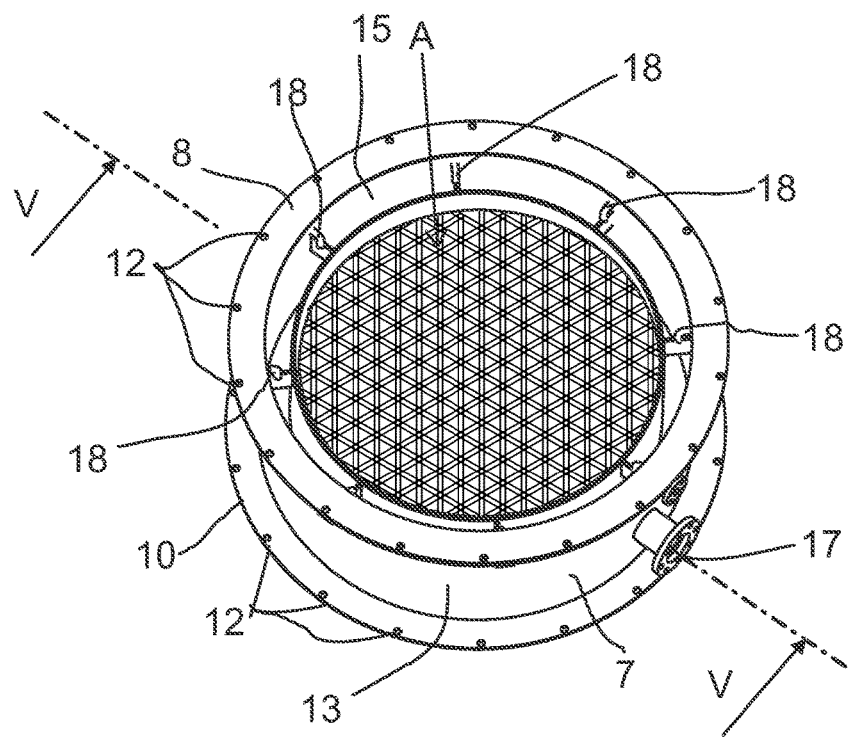
FIG. 4 is an axonometric view, seen obliquely from above, of a demister according to a second embodiment of the invention.
Figure 5:
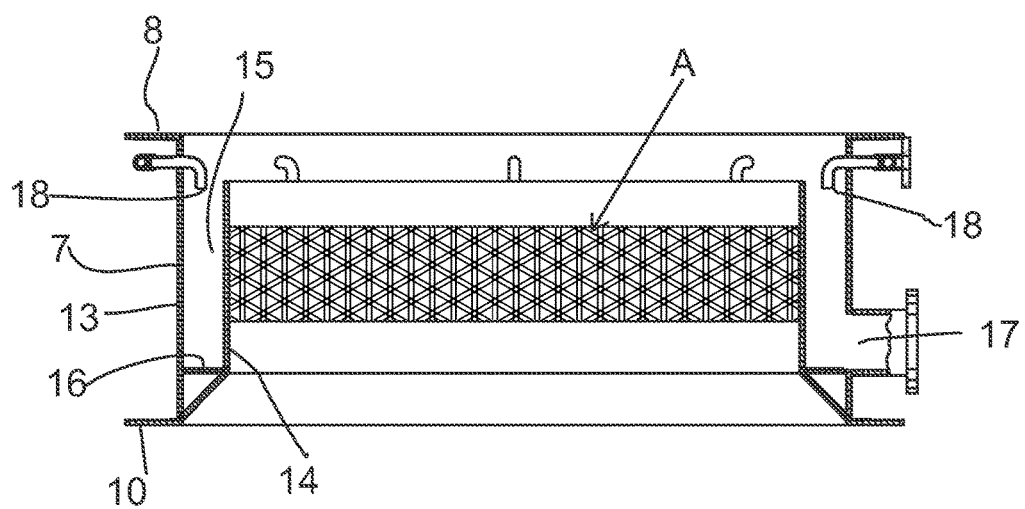
FIG. 5 is a cross-section V-V from FIG. 4, FIGS. 6a-6e illustrate steps of a method for modifying an existing wet-type gas scrubber by installation of the demister of FIG. 2 or FIG. 4.

In FIGS. 4 and 5 the structure of the demister 1 is substantially the same as described above with reference to FIGS. 2 and 3. The difference is that in FIGS. 4 and 5 the mist eliminator unit A comprises a mesh-type mist eliminator.

The demister unit 1 according to invention is usable both as a component in factory-built new gas scrubbers as well as a retrofitted accessory component for existing gas scrubbers.

Referring to FIGS. 6a to 6d a method of modifying an existing wet-type gas scrubber 2 is described.

The gas scrubber 2 may comprise a wet-scrubbing phase and a liquid separation phase 4 as described with reference to FIG. 1.

FIG. 6a illustrates the first step of the method wherein the cyclonic droplet separation tower 6 is detached from the liquid collecting tank 5. Alternatively, the cyclonic droplet separation tower 6 is cut near its lower end at a point which is adjacent to the liquid collecting tank 5.

FIGS. 6b and 6c illustrate that a second mounting flange 9 is attached (e.g. welded) to the liquid collecting tank 5, or alternatively to the part of the cyclonic droplet separation tower 6 which remained attached to the liquid collecting tank 5 after said cutting. A fourth mounting flange 11 is attached (e.g. welded) to the lower end of the detached cyclonic droplet separation tower 6.

Figure 6E:
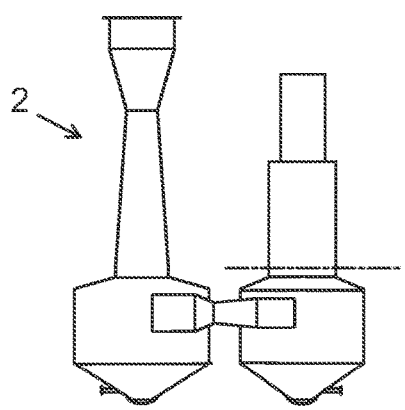
Figure 6E:
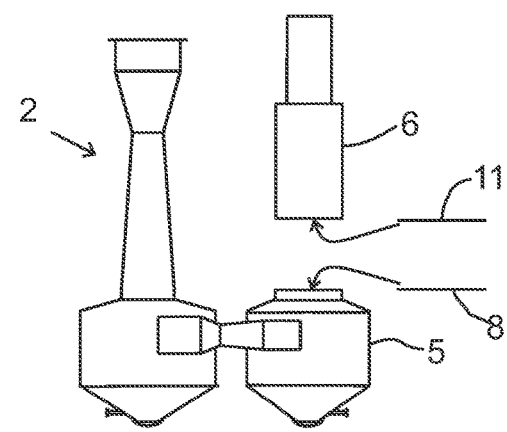
Figure 6E:
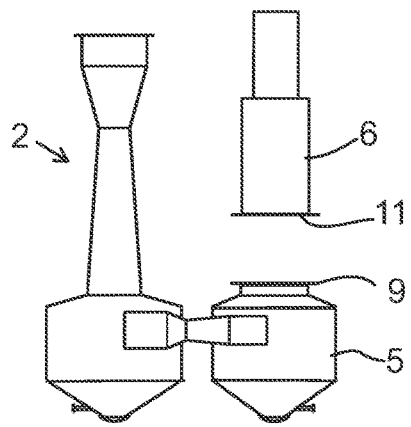
Figure 6E:
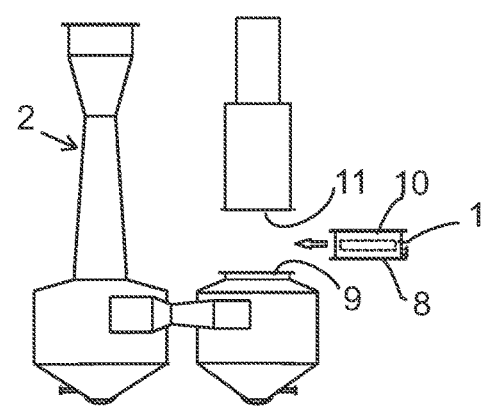
Figure 6E:
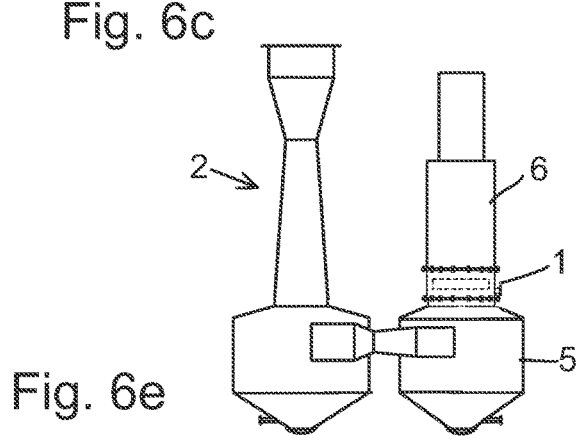

FIG. 6d illustrates installing of the demister 1 by mounting the first mounting flange 8 of the demister 1 by bolt-joints to the second mounting flange 9 which is connected to the liquid collecting tank 5, and further by mounting the fourth mounting flange 11 of the cyclonic droplet separation tower 6 by bolt-joints to the third mounting flange 10 of the demister 1 to achieve the improved gas scrubber 2 of FIG. 6e.

Although the invention has been the described in conjunction with a certain type of gas scrubber, it should be understood that the invention is not limited to any certain type of gas scrubber. While the present inventions have been described in connection with a number of exemplary embodiments and implementations, the present inventions are not so limited, but rather cover various modifications and equivalent arrangements, which fall within the purview of prospective claims.

The invention claimed is:

1. A demister configured for installation to a wet-type gas scrubber which comprises a wet-scrubbing phase and a liquid separation phase, said liquid separation phase including a liquid collecting tank and a cyclonic droplet separation tower attached on the liquid collecting tank for receiving a gas stream therefrom, said demister comprising a tubular frame containing a mist eliminator unit for removal of liquid droplets from a gas stream, characterized in that the demister is a separate integral unit adapted to be removably attachable between the liquid collecting tank and the cyclonic droplet separation tower, where the frame comprises:
   a tubular outer wall having an inner diameter which substantially equals the inner diameter of the cyclonic droplet separation tower, and
   a tubular inner wall having an outer diameter which is smaller than the inner diameter of the outer wall, said inner wall being disposed coaxially inside the outer wall, and that the mist eliminator unit is mounted inside the inner wall.

2. The demister according to claim 1, characterized in that the tubular frame comprises
   a first mounting element adapted for mounting to a corresponding second mounting element of the liquid collecting tank, and
   a third mounting element adapted for mounting to a corresponding fourth mounting element of the cyclonic droplet separation tower.

3. The demister according to claim 2, characterized in that the mounting elements are mounting flanges with a plurality of bolt holes.

4. The demister according to claim 1, characterized in that the frame comprises
   a launder for collecting liquid and solids, said launder having an inner space limited by the outer wall, the inner wall and a bottom; and
   a discharge channel in the outer wall adjacent to the bottom for removal of liquid and solids from the inner space of the launder.

5. The demister according to claim 4, characterized in that the demister comprises jet nozzles each adapted for spraying a jet of pressurized cleaning medium, such as pressurized liquid or gas, to clean the mist eliminator unit and/or the launder from accumulated solids.

6. The demister according to claim 1, characterized in that the mist eliminator unit comprises a vane-type mist eliminator.

7. The demister according to claim 6, characterized in that the mist eliminator unit comprises a plurality of radially arranged fixed swirl vanes that cause a swirling motion in the gas stream.

8. The demister according to claim 1, characterized in that the mist eliminator unit comprises a mesh-type mist eliminator.

9. A wet-type gas scrubber comprising
   a wet-scrubbing phase,
   a liquid separation phase, said liquid separation phase including a liquid collecting tank and a cyclonic droplet separation tower attached on the liquid collecting tank for receiving a gas stream therefrom, and a tubular frame containing a demister comprising a mist eliminator unit for removal of liquid droplets in a gas stream, characterized in that the demister is a separate integral unit adapted to be removably attachable between the liquid collecting tank and the cyclonic droplet separation tower, where the frame comprises:
   a tubular outer wall having an inner diameter which substantially equals the inner diameter of the cyclonic droplet separation tower, and
   a tubular inner wall having an outer diameter which is smaller than the inner diameter of the outer wall, said inner wall being disposed coaxially inside the outer wall, and that the mist eliminator unit is mounted inside the inner wall.

10. The wet-type gas scrubber according to claim 9, characterized in that the tubular frame comprises
    a first mounting element adapted for mounting to a corresponding second mounting element of the liquid collecting tank, and
    a third mounting element adapted for mounting to a corresponding fourth mounting element of the cyclonic droplet separation tower.

11. The wet-type gas scrubber according to claim 10, characterized in that the mounting elements are mounting flanges with a plurality of bolt holes.

12. The wet-type gas scrubber according to claim 9, characterized in that the frame comprises
    a launder for collecting liquid and solids, said launder having an inner space limited by the outer wall, the inner wall and a bottom; and
    a discharge channel in the outer wall adjacent to the bottom for removal of liquid and solids from the inner space of the launder.

13. The wet-type gas scrubber according to claim 12, characterized in that the demister comprises jet nozzles each adapted for spraying a jet of pressurized cleaning medium, such as pressurized liquid or gas, to clean the mist eliminator unit and/or the launder from accumulated solids.

14. The wet-type gas scrubber according to claim 9, characterized in that the mist eliminator unit comprises a vane-type mist eliminator.

15. The wet-type gas scrubber according to claim 13, characterized in that the mist eliminator unit comprises a plurality of radially arranged fixed swirl vanes that cause a swirling motion in the gas stream.

16. The wet-type gas scrubber according to claim 9, characterized in that the mist eliminator unit comprises a mesh-type mist eliminator.

* * * * *